Iven Paulson
INVENTOR.

United States Patent Office 2,792,237
Patented May 14, 1957

2,792,237

BOAT TRAILER PLATFORM CONSTRUCTION FOR TRANSPORTING AN INVERTED BOAT

Iven Paulson, Pleasant Lake, N. Dak.

Application May 11, 1954, Serial No. 428,880

2 Claims. (Cl. 280—414)

The present invention relates to new and useful improvements in boat trailer platforms such as are used to transport a small boat to and from a beach or shore and to assist in transporting the boat and otherwise handling the boat.

It will be evident from the given statement of the invention that I am aware that there are many and varied styles and forms of small boat carting trailers and it is this relatively developed line of endeavor that I aim to improve thereby retaining the necessary simplicity and design and construction, sturdiness and reliability, being well adapted for its intended purposes and relatively inexpensive to manufacture.

An object of this invention is to provide a boat trailer platform having a means for supporting and positioning an inverted boat thereon and hold-down straps for securing the boat to the supporting platform.

Another object of this invention is to provide a boat trailer platform which may be easily attached to a towing vehicle and which has a safety feature in the form of a supporting member at the forward end of the trailer wherein the trailer will be supported if the device becomes accidentally dislodged from the towing vehicle and supporting the trailer in substantially horizontal position when the trailer is unhitched.

A still further object of this invention is to provide a boat trailer platform having a removable extension thereon for positioning various types of boats and also provided with cushioning means for engaging the boats thereby preventing the scratching and marring of the boat surfaces.

Yet another important object of this invention is to provide a boat trailer platform having means thereon for retaining a container for fishing apparatus, or the like, thereby providing not only a boat trailer but an efficient carrier for incidental equipment necessary to a successful fishing or camping trip.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a top plan view of an extension that may be positioned on the rear portion of the platform for supporting a different type of boat than that illustrated in the present embodiment.

Figure 1:
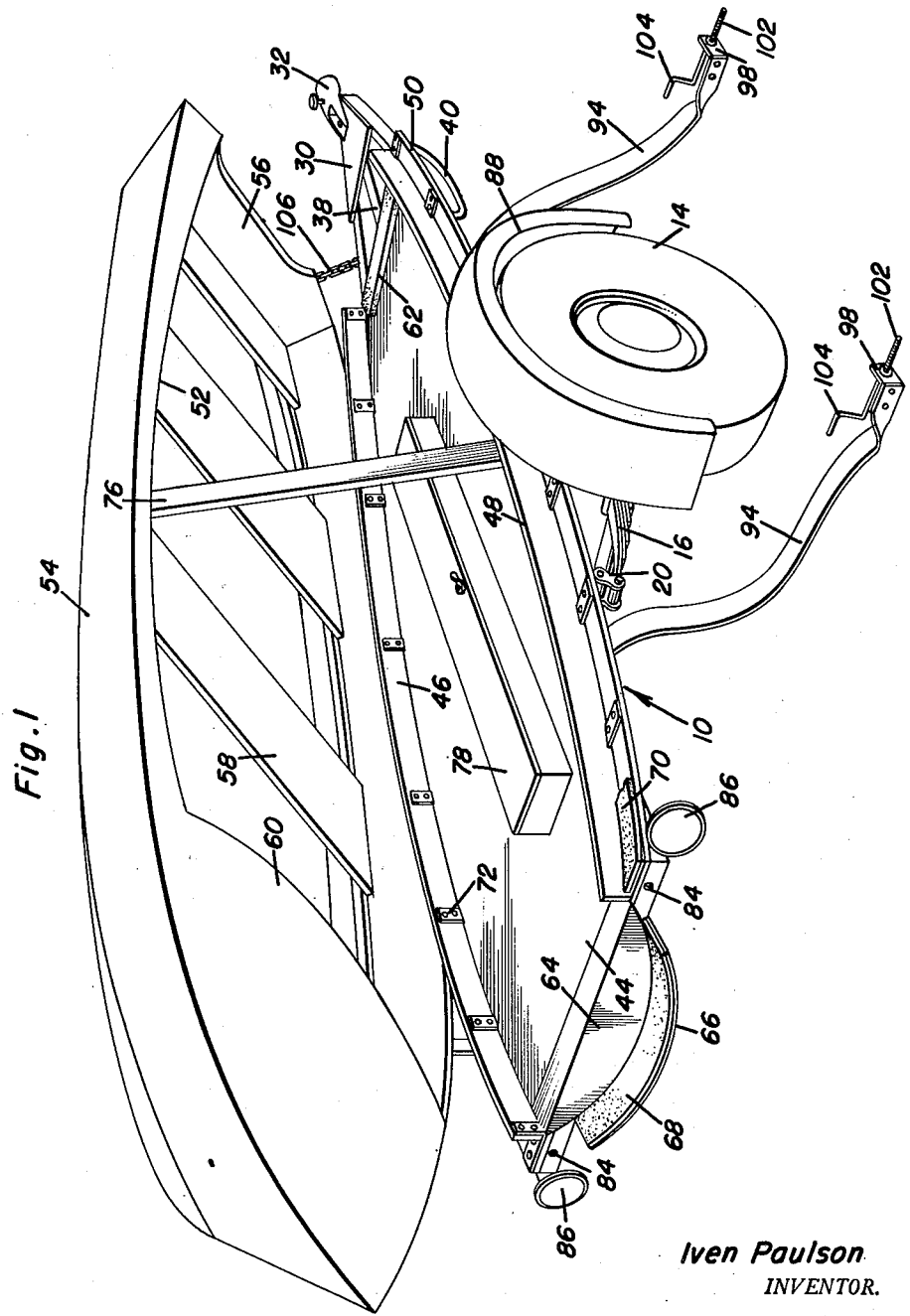
Figure 1 is a perspective view showing the boat trailer platform of the present invention with the inverted boat propped up on one side showing the relationship of the various portions of the boat and the boat trailer.
Figure 2:
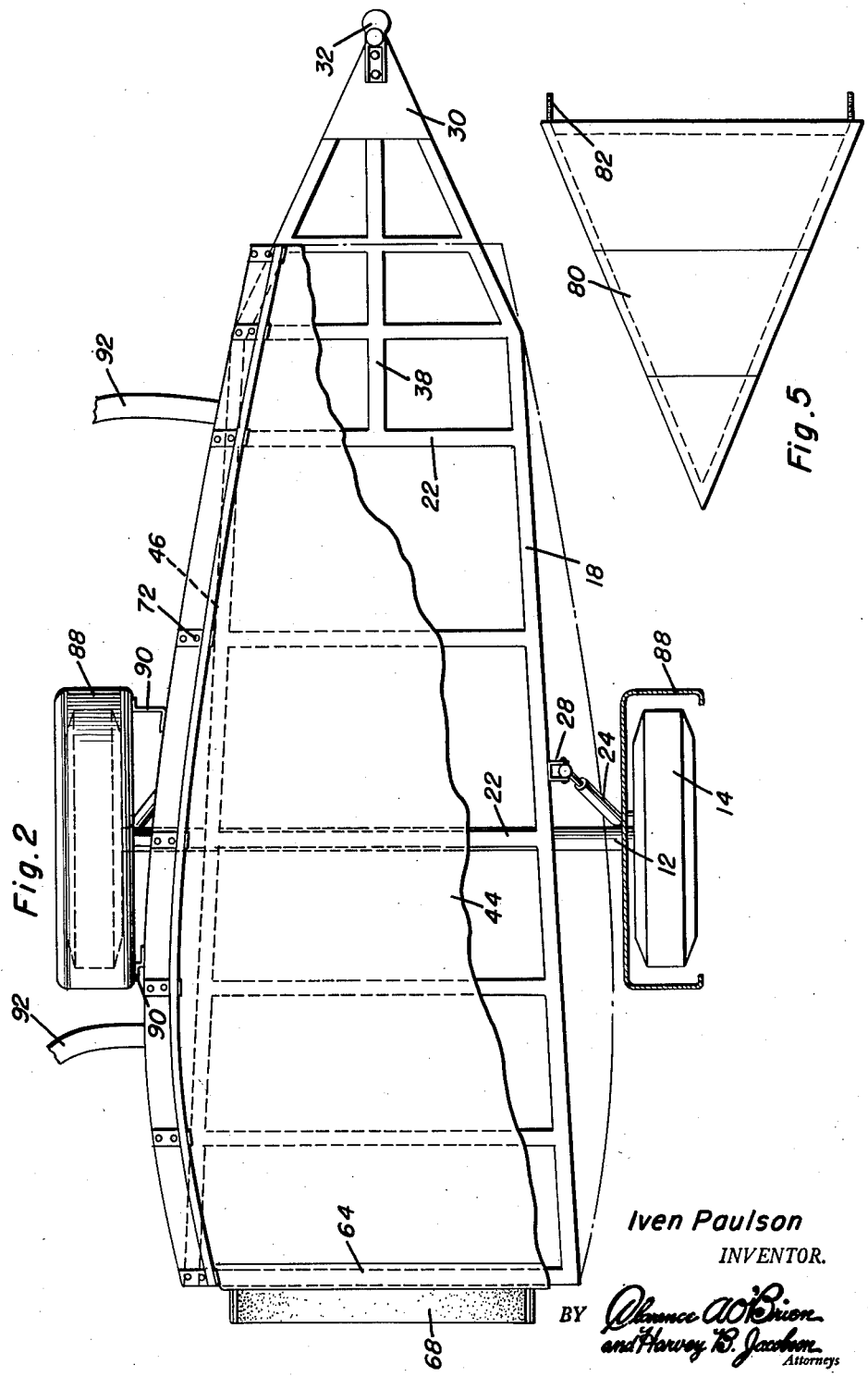
Figure 2 is a top plan view of the boat trailer platform of the present construction with portions thereof broken away showing the construction of the trailer frame and the relationship of the ground engaging wheels thereto.
Figure 3:
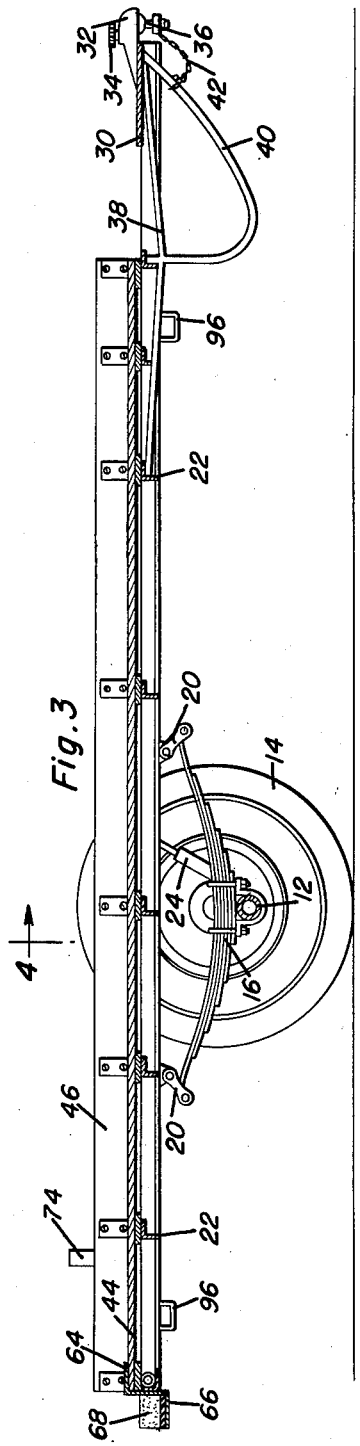
Figure 3 is a longitudinal, vertical sectional view taken substantially along a plane passing through the longitudinal center line of the boat trailer platform of the present invention and showing the details of construction thereof.

Referring now specifically to the drawings, it will be seen that the numeral 10 generally designates the boat trailer platform of the present invention including a transversely extending axle 12 having a ground engaging wheel 14 rotatably journaled on each end thereof. A pair of longitudinally disposed leaf springs 16 are secured to the axle 12 adjacent opposite ends thereof and adjacent the central portions of the leaf spring 16. The remote end portions of the leaf spring 16 are secured to spaced points on a pair of longitudinal frame rails 18 by suitable shackles 20. The longitudinal frame rails 18 are secured in rigid relation by a plurality of longitudinally spaced transverse frame rails 22. A pair of upwardly converging and forwardly inclined airplane type shock absorbers 24 are provided with one of the shock absorbers 24 being provided at each side of the trailer 10 and interconnecting a bracket 26 secured to each end of the axle 12 and a bracket 28 secured to the longitudinal frame rails 18. The forward portions of the longitudinal frame rails 18 converge inwardly and terminate in a generally triangular plate 30 having a ball socket hitch member 32 projecting forwardly therefrom with a suitable clamp screw 34 for engaging over the ball member 36 mounted on a suitable towing vehicle, or the like. A reinforcing member 38 extends along the longitudinal center line of the trailer 10 and is secured to the forward transverse frame member 22 for reinforcing the forward portion of the trailer 10. A depending substantially U-shaped supporting leg 40 is secured to the longitudinal frame member 38 and the central undersurface of the plate 30, and it will be seen that the forward leg of the supporting U-shaped member 40 is sloped at a gradual angle thereby forming a skid bar or runner for supporting the forward end of the trailer 10 when the ball socket hitch 32 is disengaged from the ball 36. A safety chain 42 is provided between the ball 36 and the supporting leg 40 for retaining the trailer 10 in hitched position.

Figure 4:
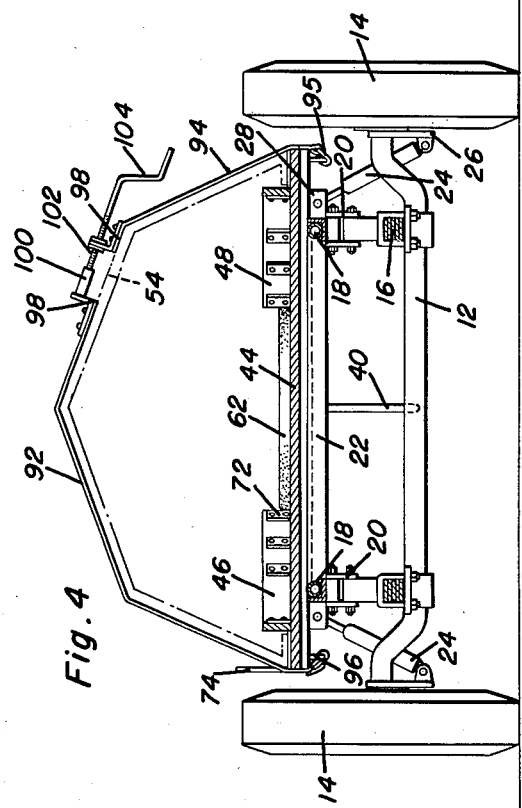
Figure 4 is a transverse, vertical sectional view taken substantially along a plane passing on section line 4—4 of Figure 3 showing the transverse relationship of the various details of construction.

A generally elongated and oval shaped platform 44 is secured to the upper surface of the longitudinal frame rails 18 and the transverse frame rails 22 and the upper surface of the platform 44 is provided with a pair of generally curved vertical plates 46 and 48 which are generally parallel to the curved peripheral side edges, as indicated by the numeral 50 of the platform 44. It will be seen that the vertical plates 46 extend upwardly from the upper surface of the platform 44 thereby forming upstanding ribs for entrance into the opening 52 of an inverted boat 54. It will be seen that the boat 54 has a stern board 56, suitable seats 58, and a convex bow portion 60. The boat 54 is positioned with the stern board 56 positioned forwardly of the trailer 10 and a suitable cushioning element 62 is provided transversely of the forward end of the platform 44 for engaging and cushioning the stern board 56. A transversely extending bracket member 64 having a concavely curved projecting ledge 66 is provided with a cushion member 68 for engaging the convex portion 60 of the bow of the boat 54 thereby supporting and engaging the boat 54 without scratching or marring the surface. Suitable cushion members 70 are provided along the peripheral upper edges of the platform 44 exteriorly of the vertical plates 46 and 48 for engaging the upper surfaces of the gunwales of the boat 54 for supporting the boat similar to the cushion members 62 and 68. It will be seen that upstanding attaching brackets 72 are provided for securing the vertical plates 46 and 48 to the upper surface of the platform 44. As seen in Figure 4, an upstanding member 74 is provided at one edge of the platform 44 for engaging the side of a boat when it is tilted in a position substantially as shown in Figure 1 for engaging the movement thereof. A suitable prop 76 is provided for retaining the boat in its inclined position. The inner surface of the platform 44 between the vertical plates 46 and 48 may be utilized for holding an elongated container 78 having fishing apparatus such as fishing rods and reels therein. As shown in Figure 5, a generally V-shaped extension platform member 80 is provided with a pair of parallel projecting studs 82 that are threaded and positioned on the base of the triangular extension 80 for engagement with apertures 84 in the rearmost transverse frame member 22. Suitable reflectors 86 are provided on each side of the frame rails 18 as required by most State laws and if desirable, suitable brake, lights, stoplights, etc. may be provided. Fenders 88 are provided over the ground engaging wheels 14 and are supported by suitable brackets 90 for protecting the boat from dirt thrown by the ground engaging wheels 14. A pair of strap members 92 and 94 are pivotally secured by detachable hooks 95 to depending loops 96 on the undersurface of the platform 44 and the adjacent ends of the strap 92 and 94 are provided with right angular lugs 98 having vertically disposed leg portions in opposition to each other. One of the vertically disposed legs is provided with an elongated threaded socket 100 and the other of the vertical legs of the other lug 98 is provided with a captive externally threaded rod 102 having an offset handle 104 wherein the straps 92 and 94 may be moved toward each other thereby holding the boat 54 on the upper surface of the platform 44 with the gunwale positioned over the upstanding vertical plates 46 and 48 wherein the opening 52 of the boat 54 will be retained over the plates 46 and 48 thereby securing the boat 54 onto the upper surface of the platform 44. Obviously, the straps 92 and 94 may be constructed of any suitable flexible material and the extension 80 may or may not be provided with the upstanding plates and removed for other uses of the trailer.

In operation, the boat 54 is positioned on the upper surface of the platform 44 with the opening therein positioned over the vertical plates 46 and 48 thereby positioning the boat in an obvious manner. The upstanding members 46 and 48 facilitate the positioning of the boat 54 on the platform 44 and the hold-down straps 92 and 94 securely retain the boat thereon. Obviously, the ground engaging wheels 14 may be provided with any well known pneumatic tire and the other elements of the boat trailer 10 may be constructed of well known and readily obtainable materials thereby enhancing the economic feasibility of the boat trailer.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a trailer for a boat, an enlarged open top defined by a stern board and a convex forward deck comprising a mobile frame provided with supporting wheels, a generally horizontally disposed platform of oval-shape mounted on said frame, a pair of upstanding longitudinally elongated plates on the upper surface of the platform, each of said plates being curved and spaced inwardly from the adjacent edge of the platform for telescopically entering the enlarged open portion of a boat supported on the platform in inverted position for preventing lateral displacement of the boat and articles disposed on the upper surface of the platform between the upstanding plates, cushioning means on the upper surface the portion of the platform exteriorly of the upstanding plates for supporting engagement with the gunwales of the inverted boat thus preventing the scratching of the gunwales, means at the front end of the frame for attachment to a towing vehicle, a depending supporting leg of generally U-shaped configuration on the front portion of the frame for supporting the same when unhitched from a vehicle and forming a skid bar for the frame, a depending bracket on the rear end of said platform, a concave ledge on the lower end of said bracket, cushioning means on said ledge for supporting the convex forward deck portion of the boat, and means connected to opposite edges of the platform for clampingly holding a boat on the platform, the edge of the forward deck portion engaging the depending bracket preventing the forward sliding movement of the boat, the forward ends of the upstanding plates forming stop means for engagement with the inner surface of the stern board of the boat for preventing rearward sliding movement of the boat on the platform.

2. The combination of claim 1 wherein said clamping means includes adjustable length straps extending over the bottom of the inverted boat.

References Cited in the file of this patent
UNITED STATES PATENTS

| | | |
|---|---|---|
| 1,899,900 | Nelson | Feb. 28, 1933 |
| 2,180,032 | Casley | Nov. 14, 1939 |
| 2,287,055 | Olson | June 23, 1942 |
| 2,310,431 | Hart | Feb. 9, 1943 |
| 2,388,870 | Sackett | Nov. 13, 1945 |
| 2,509,067 | Leach | May 23, 1950 |
| 2,594,540 | Cole et al. | Apr. 29, 1952 |
| 2,676,716 | Sallis | Apr. 27, 1954 |
| 2,684,796 | Swenson | July 27, 1954 |
| 2,720,413 | Halverson | Oct. 11, 1955 |

FOREIGN PATENTS

| | | |
|---|---|---|
| 274,946 | Germany | June 3, 1914 |
| 470,114 | Great Britain | Aug. 10, 1937 |